United States Patent [19]
Olson et al.

[11] Patent Number: 5,123,108
[45] Date of Patent: Jun. 16, 1992

[54] IMPROVED CPU PIPELINE HAVING REGISTER FILE BYPASS AND WORKING REGISTER BYPASS ON UPDATE/ACCESS ADDRESS COMPARE

[75] Inventors: Stephen W. Olson, Wilmington; James B. MacDonald, Dracut, both of Mass.

[73] Assignee: Wang Laboratories, Inc., Lowell, Mass.

[21] Appl. No.: 405,794

[22] Filed: Sep. 11, 1989

[51] Int. Cl.⁵ .............. G06F 9/38; G06F 9/302; G06F 13/396; G06F 13/42
[52] U.S. Cl. .............. 395/800; 364/262.4; 364/262.8; 364/263; 364/263.3; 364/243.4; 364/243.41; 364/243.43; 364/243.42; 364/243.5; 364/243.6; 364/243.7; 364/240.8; 364/240.5; 364/DIG. 1
[58] Field of Search ... 364/200 MS File, 900 MS File

[56] References Cited
U.S. PATENT DOCUMENTS

| | | | |
|---|---|---|---|
| 4,594,682 | 6/1986 | Drimak | 364/900 |
| 4,639,866 | 1/1987 | Loo | 364/200 |
| 4,901,267 | 2/1990 | Birman et al. | 364/736 |

FOREIGN PATENT DOCUMENTS 0155211 9/1985 European Pat. Off.
0269980 6/1988 European Pat. Off.

Primary Examiner—Thomas C. Lee
Assistant Examiner—Daniel Pan
Attorney, Agent, or Firm—Michael H. Shanahan

[57] ABSTRACT

An A output and a B output of a register file 16 are each provided to an associated multiplexer (18,20). Each multiplexer has as a further input a bus (CB00:31) that conveys a result from an ALU 22 via an ALU shifter 28. Outputs of the multiplexers are provided to corresponding A or B inputs of the ALU. Each multiplexer is controlled by an associated register file address comparator (24,26). The address comparators each have as an input corresponding register file A and B update and access addresses. The address comparators compare their associated register file update and access addresses to determine if the register file register selected for access is equal to the register file register selected for update. If these two addresses are found to be equal it is indicated that the result of an ALU operation during an instruction cycle N is to be used as an operand for an ALU operation during a cycle N+1. When this condition is detected the output of the associated address comparator enables the corresponding multiplexer select input to gate the ALU result directly to the corresponding input of the ALU, thereby effectively bypassing the register file.

13 Claims, 2 Drawing Sheets

IMPROVED CPU PIPELINE HAVING REGISTER FILE BYPASS AND WORKING REGISTER BYPASS ON UPDATE/ACCESS ADDRESS COMPARE

FIELD OF THE INVENTION This invention relates generally to data processing apparatus and method and, in particular, to a Central Processor Unit (CPU) arithmetic/logic pipeline of improved speed and efficiency that employs a register file bypass when a register file update address equals a register file access address.

BACKGROUND OF THE INVENTION

A register file is found in many data processing units and comprises a plurality of registers coupled to an arithmetic/logic unit (ALU), the registers being employed for storing operands and results of arithmetic or logical operations such as floating point operations, various control operations, etc. The register file may be considered as a local store cache of high speed high performance random access memory (RAM). The greater the number of registers within the register file the greater is the amount of data that may be stored within the CPU itself. Thus, as the register file is made larger fewer accesses are required to be made to typically slower system memory to retrieve oeprands and to store the results of ALU operations. As such, it can be appreciated that any improvements in speed and efficiency that are achieved in regard to the operation of the register file and ALU have a direct impact upon the overall speed and processing efficiency of the CPU.

In some types of systems the register file is accessed (read) and updated (written) during a single CPU instruction cycle. However, as the CPU cycle time is reduced a problem is created in that there is not sufficient time for the register file to be accessed for an ALU operation and the result of the ALU operation written back to the register file during the same cycle. One solution to this problem is to access the register file during a first CPU cycle (cycle N) and to update the register file during a next consecutive CPU cycle (cycle N+1).

However, this solution creates a problem for those types of CPU instructions wherein a result generated during cycle N is required to written back to the register file during cycle N+1 and is also required to be used as an operand during cycle N+1. Such a condition occurs in a pipelined CPU wherein the execution of instructions are overlapped such that a second instruction is begun before the execution of a preceding first instruction is completed.

FIG. 1a illustrates in block diagram form a portion of a conventional CPU 1 pipeline having a multiplexer (MUX) 2. MUX 2 receives a first input from a CPU databus and a second input from a result (R) output of an ALU 4. Interposed between the MUX 2 and the ALU 4 is the register file 3. The register file 3 is comprised of a plurality of registers such as 16, 64, 128 or 256 registers. The number of bits (m) of the various data paths and the width of the individual registers varies between implementations and is usually within the range of eight to 128 bits. The register file 3 receives an update register address during a cycle N and an access register address during a cycle N+1. The update address is an address that selects a register wherein the ALU 4 result is written. The access address is an address that selects a register that is read out to either the A port or the B port and subsequently to the corresponding input of the ALU 4. The result (R) output of the ALU is directed back to the input of the multiplexer for updating a register within the register file. Of course, the R output of the ALU is typically also directed to a number of other circuits that are not shown in the simplified block diagram of FIG. 1.

In accordance with this conventional system and referring to FIG. 1b there is shown a first instruction that has the form A+B=B. That is, the operand stored within a register file location A is added to the operand stored within a register file location B and the result is written back to (updated in) register file location B. A next instruction is of the form C+B=D wherein one of the operands (B) is contained within the updated register from the previous instruction. In this case, in that the operations are pipelined within the CPU and execute in an overlapping manner with one another, the result of the first operation may not yet be updated within the register file when the second operation is begun. By example, an instruction of the form A+C=C followed by C+D=D presents the same problem in that the register file location to be updated (C) is also required as an operand for the second pipelined instruction.

It is therefore an object of the invention to provide an improved CPU arithmetic/logical pipeline wherein an ALU result is directly provided as an operand during an immediately subsequent pipelined operation without first being updated within a register file.

It is another object of the invention to provide an improved CPU arithmetic/logical pipeline that includes circuitry for bypassing a local operand store when an ALU result is required as an input to the ALU during a cycle wherein the ALU result is also required for updating a location within the local operand store.

SUMMARY OF THE INVENTION

The foregoing problems are overcome and the objects of the invention are realized by apparatus and method that provides a significant speed improvement for those types of operations wherein a storage element such as a register file location or a working register is required to be updated with a result of a previous operation and simultaneously accessed to provide an operand for a subsequent operation. The invention serves to detect such a condition and to provide the output of the previous operation directly to an ALU without incurring an additional delay required to first update and then subsequently access the storage element.

In accordance with a specific embodiment an A output and a B output of a register file are each provided to an associated multiplexer. Each multiplexer has as a further input a bus that conveys a result from an ALU. Outputs of the multiplexers are provided to corresponding A or B inputs of the ALU. Each multiplexer is controlled by an associated register file address comparator. The address comparators each have as an input corresponding register file A and B access addresses and a register update address. The address comparators compare their associated register file update and access addresses to determine if the register file register selected for access is equal to the register file register selected for update. If these two addresses are found to be equal it is indicated that the result of an ALU operation during an instruction cycle N is to be used as an operand for an ALU operation during a cycle N+1. When this condition is detected the output of the associated address comparator enables the corresponding multiplexer select input to gate the ALU result directly to the corresponding input of the ALU, thereby effectively bypassing the register file.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

The ensuing description is made the context of a register file having 128 registers each 32 bits wide. It should be realized however that the invention can be practiced with register files of any practical depth and width and is not restricted to operation with the specific example given below.

Figure 2:
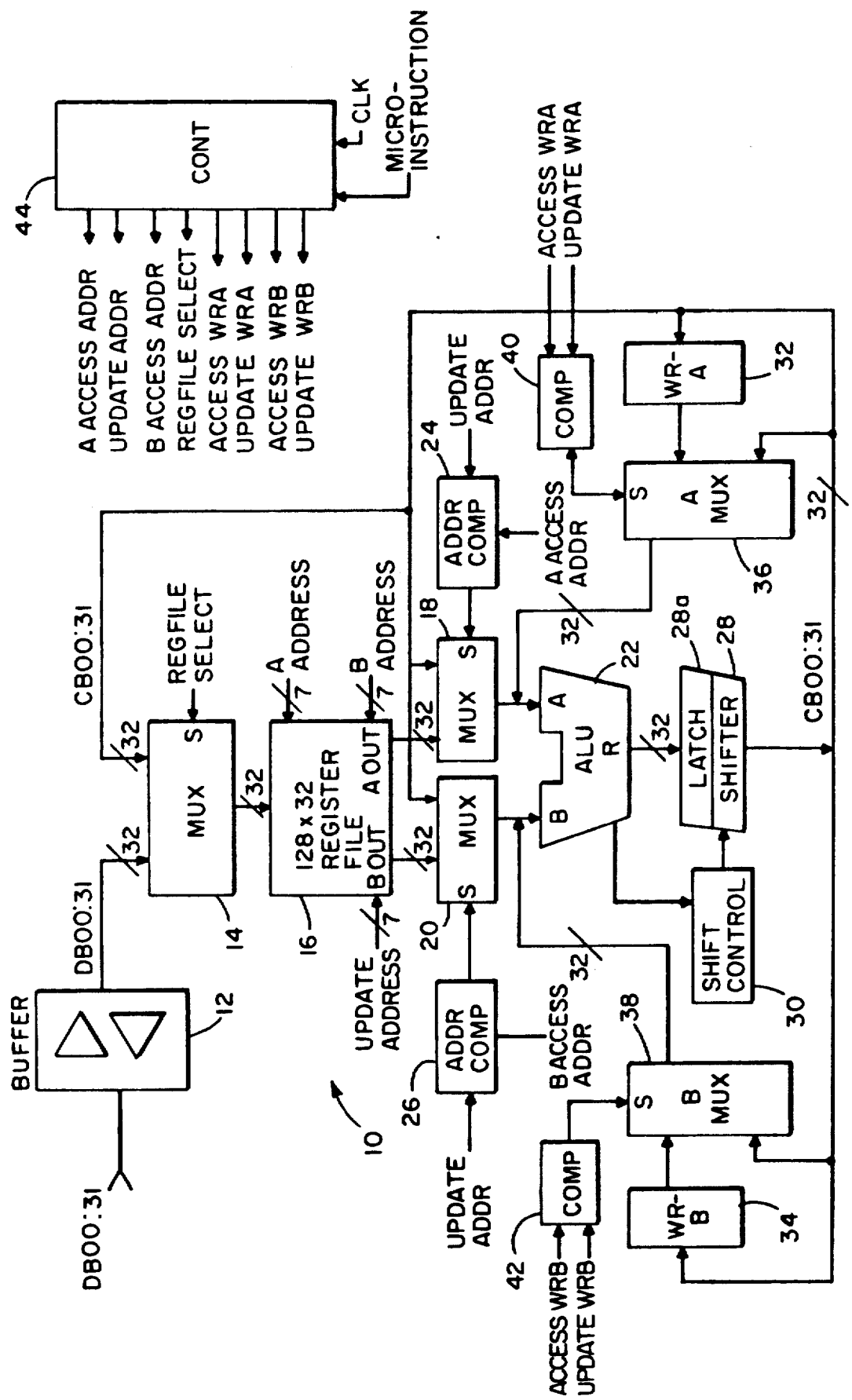
FIG. 2 is detailed block diagram illustrating a register file having bypass circuitry constructed and operated in accordance with the invention.

FIG. 2 is a block diagram that illustrates a portion of a central processor unit (CPU) 10 constructed and operated in accordance with invention. The CPU 10 may be implemented in a number of different types of hardware embodiments including but not limited to microprocessors, minicomputers, and mainframe computers. By example the CPU 10 may be a VS-type computer, specifically a VS-8000 computer, that is manufactured by Wang Laboratories, Inc. of Lowell, Ma. CPU 10 includes a 32 bit databus DB00:31 coupled through a bidirectional buffer 12 to a first input of a multiplexer (MUX) 14. A second input of the MUX 14 is coupled to a 32 bit C Bus (CB00:31). A choice of DB00:31 or CB00:31 for coupling through the MUX 14 is made by a REG FILE SELECT input to a MUX 14 select (S) input. The selected 32 bit bus is routed to an output of MUX 14 and is provided to an input of a local operand store implemented as a 128 ×32 register file (REG FILE) 16. REG FILE 16 also has as inputs a seven bit A access address bus and a seven bit B access bus for identifying specific ones of the 128 registers within the REG FILE 16 that are to be accessed (read). The REG FILE 16 also has as an input a seven bit update address bus for identifying the register to be updated (written). The update address bus is a registered or delayed version of the B access bus. That is, during a cycle N the update address bus updates the register accessed during cycle N−1 by the B access address. REG FILE 16 also includes a 32 bit A output and a 32 bit B output. The data appearing on the A output is addressed and accessed by the A access bus and the data appearing on the B output is addressed and accessed by the B access bus.

Figure 1A:
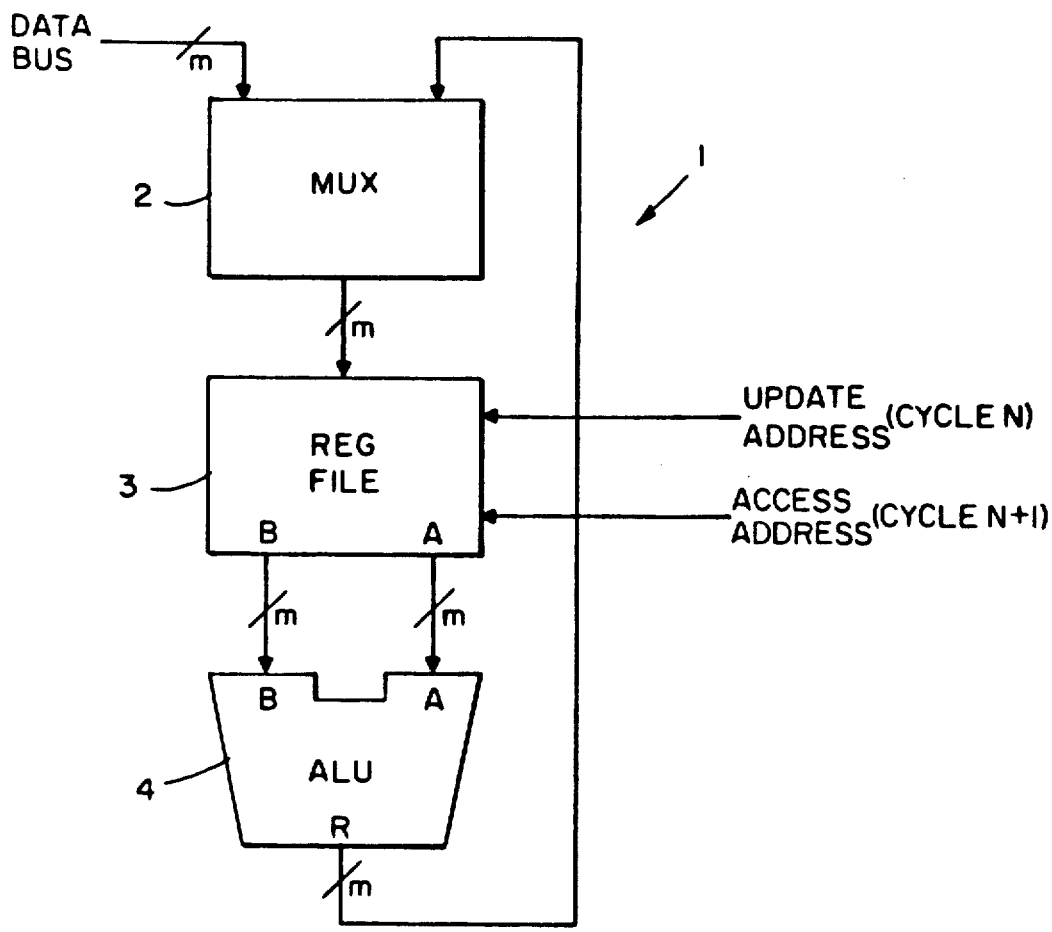
FIG. 1a is block diagram illustrating a conventional register file/ALU interconnection.
Figure 1B:
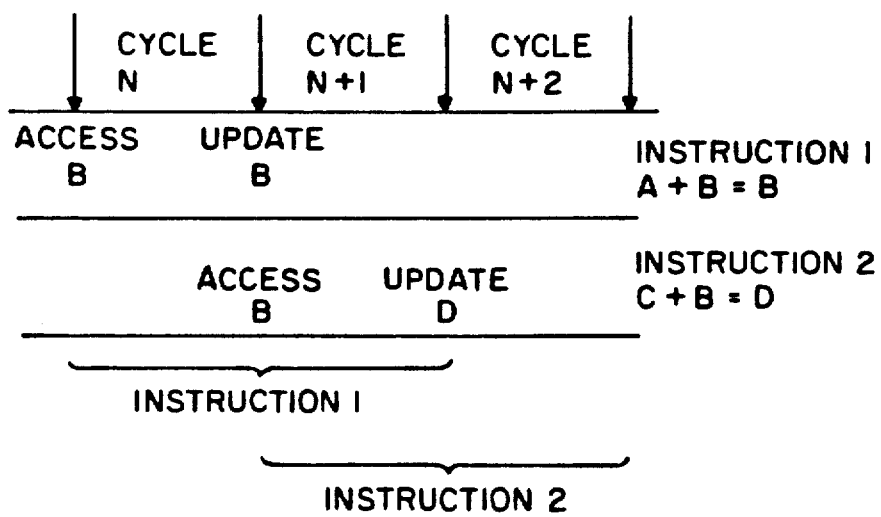
FIG. 1b is a graphical depiction of two pipelined instructions having a form wherein during a cycle N+1 a previous ALU result is required for updating a register file location and is also required as an operand for a current ALU operation.

In a conventional system, such as the system shown in FIG. 1, the 32 bit A and B outputs would be coupled directly to an ALU. However, and in accordance with the invention, the 32 bit A output and the 32 bit B output of REG FILE 16 are instead each provided to an associated MUX 18 and MUX 20, respectively. MUX 18 and MUX 20 each have as a further input CB00:31. An output of MUX 18 is provided to an A input of an ALU 22 and an output of MUX 20 is provided to a B input of ALU 22. MUX 18 and MUX 20 are each controlled by an associated address comparator (ADDR COMP) 24 and 26, respectively. Address comparators 24 and 26 each have as an input corresponding REG FILE 16 access addresses and the update address. The address comparators 24 and 26 compare these REG FILE 16 addresses to determine if the REG FILE 16 register selected for access during a current cycle is equal to the REG FILE 16 register selected for update during the cycle. If these two addresses are found to be equal it is indicated that the result of an ALU operation during an instruction cycle N is to be used as an operand for an ALU operation during the subsequent cycle N+1. When this condition is detected the output of the associated address comparator 24 and 26 enables the corresponding multiplexer MUX 18 or MUX 20 select (S) input to gate the ALU 22 result on CB00:31 directly to the corresponding input of the ALU 22, thereby effectively bypassing the REG FILE 16.

If the update address does not equal the corresponding A or B access address the S input to MUX 18 and MUX 20 is not asserted and these multiplexers select instead the corresponding output of REG FILE 16 as the source of data for the ALU 22. For example, the operation A+B=C followed by the operation A+D=E would not result in the REG FILE 16 being bypassed in that neither operand (A or D) of the second instruction is updated as a result of the first instruction.

Continuing with the description of the portion of CPU 10 shown in FIG. 2 the output of the ALU 22 is provided to a latch 28a and from the latch 28a to an ALU shifter 28. Shifter 28 is under the control of a shift control logic block 30. ALU shifter 28 operates in a conventional manner to position if required the latched ALU result before the ALU result is provided to the CB00:31 bus.

Further in accordance with the invention there is also provided a bypass for an A working register (WR-A) 32 and for a B working register (WR-B) 34. In this case the working register is a temporary register used for certain arithmetic/logic operations. In accordance with the invention the output of the working register is provided to an input of an associated multiplexer AMUX 36 or BMUX 38. A second input to both the AMUX 36 and the BMUX 38 is the CB00:31 bus that conveys the ALU 22 result from shifter 28. Each of the multiplexers 36 and 38 has a select input coupled to an output of an associated comparator 40 and 42, respectively. Comparator 40 generates an output to cause the AMUX 36 to select the CB00:31 input instead of the WR-A 32 output when the state of logical signals indicate that the source of an operation is WR-A 32 (ACCESS WRA) and also that the WRA 32 is being updated from the ALU 22 during the same cycle. The comparator 42 operates in an identical fashion for providing data to the B port of the ALU 22. The operation of AMUX 36 and comparator 40 thus serves to provide a fast bypass around the WR-A 32 when it is determined that the WR-A 32 is required to be updated and accessed in the same cycle, in a manner similar to that previously described for REG FILE 16. Similarly the operation of BMUX 38 and comparator 42 serves to provide a fast bypass around the WR-B 34 when it is determined that the WR-B 34 is required to be updated and accessed in the same cycle. That is, this aspect of the invention detects if an update signal for one of the working registers is asserted in conjunction with an access signal for the working register and, if so, the working register is bypassed and the ALU 22 output is coupled back to the ALU 22 input.

For the cases described above wherein the REG FILE 16 or one of the working registers is bypassed the update of the register with the ALU 22 result preferably still occurs during the cycle (N+1). However, the ALU 22 is simultaneously provided with the update data and is thus not required to wait for the REG FILE 16 or the working register to be updated.

The CPU 10 further includes a control logic block 44 operable for decoding microinstructions and for generating, in conjunction with a CPU instruction cycle clock (CLK), various control and address signals required for the operation of the CPU 10.

In accordance with the foregoing description it can be appreciated that the invention provides a significant speed improvement for those types of operations wherein a storage element such as a register file location or a working register is required to be updated with a result of a previous operation and simultaneously accessed to provide an operand for a subsequent operation. The invention serves to provide the output of the subsequent operation directly to the ALU 22 without incurring the additional delay required to update and then subsequently access the storage element.

While the invention has been particularly shown and described with respect to a preferred embodiment thereof, it will be understood by those skilled in the art that changes in form and details may be made therein without departing from the scope and spirit of the invention.

What is claimed is:

1. A method for operating an arithmetic pipeline of the type that includes a local addressable store means having a plurality of locations for storing operands, the pipeline including working register means accessed separately from the store means for storing temporary results of operations on the operands, the pipeline further comprising ALU means having inputs for receiving a first operand and a second operand from the store means or from the working register means, the ALU means having an output for expressing the result of an operation performed upon the first operand and the second operand, the method comprising the steps of:

during a first time interval addressing the store means to retrieve the first operand and a second operand therefrom;

applying the first operand and the second operand to an A input and to a B input, respectively, of the ALU means to produce at an ALU means output a temporary result for storage within a first working register means or a second working register means, the first working register having an input coupled to the output of the ALU and an output coupled to the A input of the ALU, the second working register having an input coupled to the output of the ALU and an output coupled to the B input of the ALU;

during a second time interval determining if a next operation requires for either a first operand or a second operand the result or the temporary result produced during the first time interval; and if the result or the temporary result produced during the first time interval is determined to be required for the next operation for either the first operand or the second operand, the method includes the steps of uncoupling the ALU means A input from the store means and from the first working register means, and coupling the ALU means output to the A input of the ALU means for providing the result or the temporary result thereof, or uncoupling the ALU means B input from the store means, and from the second working register means, and coupling the ALU means output to the B input of the ALU means for providing the result or temporary result thereto.

2. A method as set forth in claim 1 wherein the step of determining during a second time interval includes a step of comparing an update address associated with the store means to an access address associated with the store means to detect if the two address are equal.

3. A method as set forth in claim 1 wherein the steps of coupling and uncoupling include a step of activating a multiplexer means to select an input having the ALU means result coupled thereto for coupling the input to an output of the multiplexer means, the output of the multiplexer means being coupled to an input of the ALU means.

4. A method as set forth in claim 1 wherein step of determining during a second time interval includes a step of detecting if an update signal for the working register means is asserted in conjunction with an access signal for the working register means.

5. Data processing apparatus comprising an arithmetic pipeline of the type having a local addressable store means having a plurality of locations for storing operands, the pipeline further comprising ALU means having inputs for receiving a first operand and a second operand from a first output and from a second output, respectively, of the store means, the ALU means having an output for expressing the result of an operation performed upon the first operand and the second operand, the apparatus further comprising:

first working register means accessed separately from the store means for storing temporary results of operations on the operands, the first working register means having an input coupled to the output of the ALU means and an output coupled to a first input of the ALU means;

second working register means accessed separately from the store means for storing temporary results of operations on the operands, the second working register means having an input coupled to the output of the ALU means and an output coupled to a second input of the ALU means;

means for addressing the store means during a first time interval to retrieve a first operand and a second operand therefrom;

means for applying the first operand and the second operand to the first input and to the second input, respectively, of the ALU means to produce at an ALU means output a result or a temporary result;

means for determining during a second time interval if the ALU means requires for either the first operand or the second operand the result or the temporary result produced during the first time interval; and means, coupled to and responsive to the operation of the determining means, for uncoupling one of the ALU inputs from the output of the store means and from the output of the associated working register means and for coupling the ALU means output to either the A input or the B input of the ALU means if a next operation requires for either the first operand or the second operand the result or the temporary result produced during the first time interval.

6. Data processing apparatus as set forth in claim 5 wherein the determining means comprises comparator means for comparing an update address associated with the store means to an access address associated with the store means to detect if the two addresses are equal.

7. Data processing apparatus as set forth in claim 5 wherein the coupling means comprises multiplexer means having the ALU means output coupled to an input thereof, an output of the multiplexer means being coupled to one of the inputs of the ALU means.

8. Data processing apparatus as set forth in claim 5 wherein the determining means comprises means for detecting if an update signal for the working register means is asserted in conjunction with an access signal for the working register means.

9. Data processing apparatus as set forth in claim 5 wherein the store means is comprised of register file means organized as n locations each comprised of m bits, a particular one of the n locations being specified by a register file update address and/or by a register file success address.

10. Data processing apparatus as set forth in claim 5 wherein the determining means is responsive to signals generated as a result of decoding a microinstruction.

11. Apparatus for performing arithmetic/logical operations upon digital operands to produce a digital result, comprising:
  means having a plurality of storage locations for storing digital data expressive of operands, said storing means having a data input for receiving an operand to be stored at an address specified by an update address input, said storing means further having a first output for providing a first operand therefrom and a second output for providing a second operand therefrom, the storage locations of the first and the second operands being specified by a first access address and by a second access address, respectively;
  ALU means, for operating on a first operand and on a second operand to produce a result of a temporary result therefrom, said ALU means having a first input coupled to said first output of said storing means and a second input coupled to said second output of said storing means for receiving the first operand and the second operand, respectively, therefrom, said ALU means further having an output for providing the result or the temporary result therefrom, said ALU means output being coupled to said input of said storing means for providing the result thereto for storage therein;
  first working register means having an input coupled to the ALU means output for receiving a temporary result therefrom and having output coupled to the first input of the ALU means for providing the temporary result thereto;
  second working register means having an input coupled to the ALU means output for receiving a temporary result therefrom and having an output coupled to the second input of the ALU means for providing the temporary result thereto;
  first means for selecting either said first output of said storing means, said output of said first working register means, or said output of said ALU means for input to said first input of said ALU means; and
  second means for selecting either said second output of said storing means, said output of said second working register means, or said output of said ALU means for input to said second input of said ALU means.

12. Apparatus as set forth in claim 11 wherein the first and the second selecting means are each responsive to an operation of a comparator means that compares the update address associated with the storing means to the access addresses associated with the storing means to detect if an equality exists such that, if the update address does equal one of the access addresses, the associated one of the selecting means couples the output of the operating means to the associated input of the operating means.

13. Apparatus as set forth in claim 11 wherein the first and the second selecting means are each responsive to an operation of a detecting means that detects if an update signal for either the first or the second working register means is asserted in conjunction with an access signal for the associated working register means such that, if the update signal is asserted in conjunction with the access signal, the associated one of the selecting means couples the output of the operating means to the associated input of the operating means.

* * * * *